(12) United States Patent
Kobayashi et al.

(10) Patent No.: US 10,840,750 B2
(45) Date of Patent: Nov. 17, 2020

(54) COMPRESSOR MOTOR AND COMPRESSOR EQUIPPED WITH SAME

(71) Applicant: Sanden Holdings Corporation, Isesaki (JP)

(72) Inventors: Noriyuki Kobayashi, Isesaki (JP); Takahiro Ikeda, Isesaki (JP)

(73) Assignee: SANDEN HOLDINGS CORPORATION, Isesaki (JP)

( * ) Notice: Subject to any disclaimer, the term of this patent is extended or adjusted under 35 U.S.C. 154(b) by 244 days.

(21) Appl. No.: 16/064,292

(22) PCT Filed: Dec. 7, 2016

(86) PCT No.: PCT/JP2016/086377
§ 371 (c)(1),
(2) Date: Jun. 20, 2018

(87) PCT Pub. No.: WO2017/110476
PCT Pub. Date: Jun. 29, 2017

(65) Prior Publication Data
US 2019/0006894 A1    Jan. 3, 2019

(30) Foreign Application Priority Data

Dec. 25, 2015 (JP) .................. 2015-253454

(51) Int. Cl.
*H02K 1/18* (2006.01)
*H02K 7/14* (2006.01)
(Continued)

(52) U.S. Cl.
CPC ............ *H02K 1/185* (2013.01); *H02K 1/165* (2013.01); *H02K 3/345* (2013.01); *H02K 3/487* (2013.01);
(Continued)

(58) Field of Classification Search
CPC ........ H02K 1/185; H02K 1/165; H02K 3/345; H02K 3/487; H02K 5/24; H02K 7/14; H02K 9/00
See application file for complete search history.

(56) References Cited

U.S. PATENT DOCUMENTS 5,918,360 A * 7/1999 Forbes .................. D06F 37/304
29/596
2004/0189136 A1* 9/2004 Kolomeitsev .......... H02K 3/345
310/216.082
(Continued)

FOREIGN PATENT DOCUMENTS

JP    11-046462 A    2/1999
JP    2003-264947 A    9/2003
(Continued)

OTHER PUBLICATIONS

The State Intellectual Property Office of the People's Republic of China; The First Office Action issued in Chinese Application No. 201680070745.2, dated Jun. 28, 2019.
(Continued)

*Primary Examiner* — Thienvu V Tran
*Assistant Examiner* — Bart Iliya
(74) *Attorney, Agent, or Firm* — Baker Botts L.L.P.

(57) ABSTRACT

There is provided a compressor motor in which a teeth member and a yoke member are bonded while inhibiting deformation of bridge portions and which is capable of decreasing drop of torque due to a leakage magnetic flux. A stator is constituted of a teeth member 26 in which inner end portions of adjacent teeth 27 are continuous in a bridge portion and on which wires are wounded, and a yoke member 28 bonded to an outer side of the teeth member to form a magnetic path, the yoke member includes press-fitting concave regions 32 which are opened inwardly and into which outer end portions of the teeth are press-fitted,
(Continued)

and inner side surfaces 32A of the press-fitting concave regions which face each other possess projecting shapes, respectively, and both side surfaces 27B of each of the outer end portions of the teeth are formed in a recessed shape which matches the shape of the inner side surfaces of the press-fitting concave regions.

2 Claims, 11 Drawing Sheets

(51) Int. Cl.
  *H02K 3/34* (2006.01)
  *H02K 1/16* (2006.01)
  *H02K 5/24* (2006.01)
  *H02K 3/487* (2006.01)
  *H02K 9/00* (2006.01)
  *H02K 1/14* (2006.01)

(52) U.S. Cl.
  CPC ............... *H02K 5/24* (2013.01); *H02K 7/14* (2013.01); *H02K 9/00* (2013.01); *H02K 1/148* (2013.01)

(56) References Cited

U.S. PATENT DOCUMENTS

| | | |
|---|---|---|
| 2007/0075604 A1 | 4/2007 | Hsu |
| 2008/0061653 A1* | 3/2008 | Sagara .................. H02K 1/148 |
| | | 310/254.1 |
| 2009/0189477 A1* | 7/2009 | Yamamoto ............ H02K 1/148 |
| | | 310/216.058 |

FOREIGN PATENT DOCUMENTS

| | | |
|---|---|---|
| JP | 4147600 B2 | 7/2008 |
| JP | 2011-064099 | 3/2011 |

OTHER PUBLICATIONS

Japan Patent Office; The First Office Action issued in Japanese Application No. 2015-253454, dated Oct. 23, 2019.

* cited by examiner

COMPRESSOR MOTOR AND COMPRESSOR EQUIPPED WITH SAME

CROSS-REFERENCE TO RELATED APPLICATIONS

This application is a U.S. National Stage Patent Application under 37 U.S.C. § 371 of International Patent Application No. PCT/JP2016/086377, filed Dec. 7, 2016, which claims the benefit of Japanese Patent Application No. JP 2015-253454, filed Dec. 25, 2015, the disclosures of each of which are incorporated herein by reference in their entirety.

TECHNICAL FIELD

The present invention relates to a compressor motor stored in a container of a compressor to drive a compression element similarly stored in the container, and the compressor equipped with the motor.

BACKGROUND ART

Figure 11:
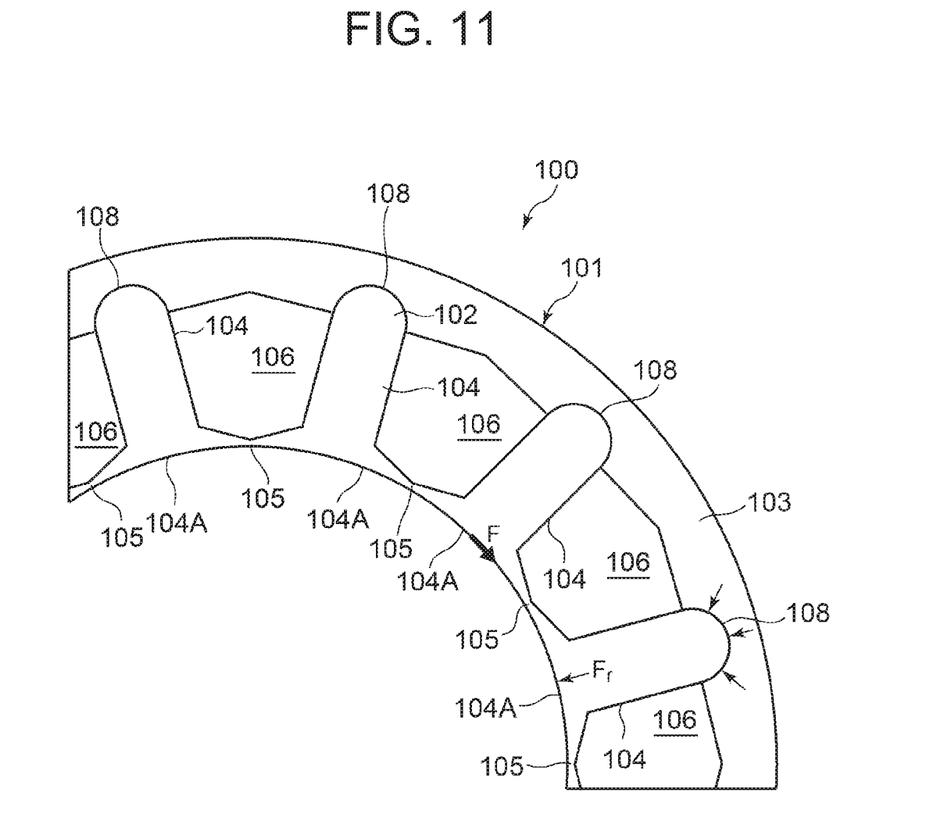
FIG. 11 is a partial plan view of a core of a conventional stator.

Heretofore, a refrigerant compressing compressor for use in a refrigerating cycle has been constituted by storing, in a container, a compression element of a scroll type or the like and a motor to drive this compression element (e.g., see Patent Document 1). FIG. 11 shows a partial plan view of a stator core of such a conventional compressor motor (e.g., see Patent Document 2). The conventional motor is constituted of a stator 100 shown in FIG. 11 and an unshown rotor which rotates on an inner side of the stator, and a rotary shaft to which this rotor is fixed drives the compression element.

A core 101 of the stator 100 of FIG. 11 has two divided constitutions in which a teeth member 102 and a yoke member 103 are separated, and in the teeth member 102, inner end portions (tip portions) 104A and 104A of respective adjacent teeth 104 and 104 are continuous with each other in a bridge portion 105. Consequently, slots 106 of the teeth member 102 open outwardly and have a closed shape in a central direction. Furthermore, unshown wires are attached to the respective teeth 104 from the outside, and positioned in the respective slots 106. The yoke member 103 is bonded to outer ends of the teeth 104 of the teeth member 102 to which the wires are attached, thereby constituting the stator 100.

Thus, in the stator 100 of the constitution in which the inner end portions 104A of the teeth 104 are continuous, a density of wires is increased to be larger than that in a motor on which a wire is directly wound from a nozzle inserted into a clearance of each of teeth inner end portions, and improvement of performance is achievable. Furthermore, the inner end portions 104A of the teeth 104 are continuous, thereby improving their rigidities, and hence, there is the advantage that an amount of deformation of the core 101 of the stator 100 due to a reactive force which accompanies the rotation of the rotor is also decreased and that generation of vibration is also inhibited.

CITATION LIST

Patent Documents

Patent Document 1: Japanese Patent Application Publication No. 2011-64099
Patent Document 2: Japanese Patent No. 4147600

SUMMARY OF THE INVENTION

Problems to be Solved by the Invention

However, due to continuous inner end portions 104A of teeth 104, a magnetic flux which originally has to pass a magnetic path passing through a yoke member 103 takes a shortcut through bridge portions 105, and a so-called leakage magnetic flux is generated. Furthermore, due to this leakage magnetic flux, drop of torque occurs, and hence, it becomes necessary to decrease the leakage magnetic flux by narrowing a width of each of the bridge portions 105 in a radial direction as shown in FIG. 11.

On the other hand, the teeth member 102 and the yoke member 103 are bonded by press-fitting outer end portions of the teeth 104 of the teeth member 102 into a plurality of (the same number as that of the teeth 104) press-fitting concave regions 108 formed in the yoke member 103, and pressing the teeth member 102 with the yoke member 103 from the outside (a circumferential side). Therefore, during this press-fitting, a fastening load Fr is applied to the teeth 104 from the outside toward an inward direction (a central direction) as shown by a thin arrow in FIG. 11.

Furthermore, stress of a bend moment generated by an electromagnetic force F (shown by a bold arrow in FIG. 11) of a rotating rotor is also applied to the teeth 104. Therefore, when the width of each of the bridge portions 105 of the teeth 104 is narrowed to decrease the leakage magnetic flux as described above and its strength deteriorates, there is the problem that the bridge portions 105 are deformed due to stress of the fastening load Fr and the stress of the bend moment generated by the electromagnetic force F.

The present invention has been developed to solve such conventional technical problems, and there are provided a compressor motor which has a structure where a teeth member and a yoke member are bonded while inhibiting deformation of bridge portions and which is capable of decreasing drop of torque due to a leakage magnetic flux, and a compressor in which the compressor motor is used.

Means for Solving the Problems

To solve the above problems, a compressor motor of the present invention is stored in a container to drive a compression element, includes a stator, and a rotor which is fixed to a rotary shaft to drive the compression element and which rotates on an inner side of the stator, and is characterized in that the stator is constituted of a teeth member in which inner end portions of adjacent teeth are continuous in a bridge portion and on which wires are wounded, and a yoke member bonded to an outer side of the teeth member to form a magnetic path, this yoke member includes press-fitting concave regions which are opened inwardly and into which outer end portions of the teeth are press-fitted, and inner side surfaces of this press-fitting concave region which face each other possesses projecting shapes, respectively, and both side surfaces of each of the outer end portions of the teeth are formed in a recessed shape which matches the shape of the inner side surfaces of the press-fitting concave regions.

The compressor motor of a particular embodiment is characterized in that in the above invention, projecting portions are formed in the inner side surfaces of the press-fitting concave region which face each other, respectively, recessed portions are formed at positions which match the respective projecting portions of the press-fitting concave regions, in both the side surfaces of each of the outer end portions of the teeth, respectively, and the projecting portions are press-fitted into the recessed portions, respectively.

The compressor motor of a particular embodiment is characterized in that in the above invention, the respective projecting portions formed in the inner side surfaces of the press-fitting concave region which face each other have a wedge shape, and the respective recessed portions formed in both the side surfaces of each of the outer end portions of the teeth have a V-shape which matches the wedge shape of the projecting portions of the press-fitting concave regions.

The compressor motor of a particular embodiment is characterized in that in the above invention, when a dimension from an outer end face of each of the teeth to an apex of the V-shape of the recessed portion in a direction parallel to a radial direction is defined as a, a dimension from a side surface of the teeth to the apex of the V-shape of the recessed portion in a width direction of the teeth is defined as b, a width dimension of the teeth is defined as B, a dimension from the outer end face of the teeth to a position of an opening of the press-fitting concave region in the direction parallel to the radial direction is defined as e, yield stress of the teeth member is defined as σy, and contact stress to be applied to the teeth when the outer end portion of the teeth is press-fitted into the press-fitting concave region is defined as σr, a value of a is set to a range of σr·B/(σy−σr)≤a≤ $\{(B-2b)/B\}^2 \cdot e$.

A compressor of a particular embodiment is characterized by including a constitution in which the motor of the above respective inventions and the compression element are stored in the container.

Advantageous Effect of the Invention

According to the present invention, a compressor motor stored in a container to drive a compression element includes a stator, and a rotor which is fixed to a rotary shaft to drive the compression element and which rotates on an inner side of the stator. The stator is constituted of a teeth member in which inner end portions of adjacent teeth are continuous in a bridge portion and on which wires are wounded, and a yoke member bonded to an outer side of this teeth member to form a magnetic path. Consequently, a density of the wires can be increased to achieve improvement of performance. Furthermore, the inner end portions of the teeth are continuous in the bridge portions, and their rigidities improve. Therefore, an amount of deformation of the stator due to a reactive force which accompanies the rotation of the rotor decreases, and generation of vibration is also inhibited.

In particular, the yoke member includes press-fitting concave regions which are opened inwardly and into which outer end portions of the teeth are press-fitted, and inner side surfaces of this press-fitting concave region which face each other possess projecting shapes, respectively, and both side surfaces of each of the outer end portions of the teeth are formed in a recessed shape which matches the shape of the inner side surfaces of the press-fitting concave regions. Consequently, outwardly positioned surfaces of inner surfaces of recessed portions of the recessed shape can receive a fastening load from the outside which is generated in press-fitting the teeth of the teeth member into the press-fitting concave regions of the yoke member.

Consequently, it is possible to decrease stress to be applied to the bridge portions in bonding the teeth member and the yoke member, and hence, even when a width of each bridge portion is narrowed, its deformation can be inhibited, a magnetic flux is hard to pass the bridge portions, leakage of the magnetic flux which takes a shortcut between the inner end portions of each teeth can remarkably be decreased, and it is possible to effectively inhibit drop of torque due to the leakage magnetic flux.

Furthermore, as in a particular embodiment, projecting portions are formed in the inner side surfaces of the press-fitting concave region which face each other, respectively, recessed portions are formed at positions which match the respective projecting portions of the press-fitting concave regions, in both the side surfaces of each of the outer end portions of the teeth, respectively, and the projecting portions are press-fitted into the recessed portions, respectively. Consequently, the outwardly positioned surface of the inner surface of each recessed portion receives the fastening load generated in bonding the teeth member and the yoke member, so that it is possible to effectively decrease the stress to be applied to the bridge portions.

In particular, as in a particular embodiment, the respective projecting portions formed in the inner side surfaces of the press-fitting concave region which face each other have a wedge shape, and the respective recessed portions formed in both the side surfaces of each of the outer end portions of the teeth have a V-shape which matches the wedge shape of the projecting portions of the press-fitting concave regions. Consequently, the teeth of the teeth member can easily be press-fitted into the press-fitting concave regions of the yoke member, whereas the projecting portions can effectively receive the fastening load.

In this case, as in a particular embodiment, when a dimension from an outer end face of each of the teeth to an apex of the V-shape of the recessed portion in a direction parallel to a radial direction is defined as a, a dimension from a side surface of the teeth to the apex of the V-shape of the recessed portion in a width direction of the teeth is defined as b, a width dimension of the teeth is defined as B, a dimension from the outer end face of the teeth to a position of an opening of the press-fitting concave region in the direction parallel to the radial direction is defined as e, yield stress of the teeth member is defined as σy, and contact stress to be applied to the teeth when the outer end portion of the teeth is press-fitted into the press-fitting concave region is defined as σr, a value of a is set to a range of σr·B/(σy−σr) ≤a. Consequently, it is possible to prevent the disadvantage that the outwardly positioned surface of the inner surface of the V-shaped recessed portion is crushed due to the fastening load and that the stress to be applied to the bridge portions of the inner end portions of the teeth increases.

Furthermore, when the value of a is set to the range of a≤$\{(B-2b)/B\}^2 \cdot e$, it is possible to prevent deterioration of strength of the teeth themselves which is caused by forming the outer end portions of the teeth in the recessed shape, it is possible to also counteract a bend moment generated by an electromagnetic force of the rotating rotor without hindrance, and in general, it is possible to decrease deformation of the bridge portions due to both of stress of the fastening load generated in bonding the teeth member and the yoke member and stress of the bend moment generated by the electromagnetic force of the rotating rotor.

Furthermore, as in a particular embodiment, a compressor includes a constitution in which the motor of the above respective inventions and the compression element are stored in the container, so that it is possible to obtain a small compressor having less vibration and high performance.

MODE FOR CARRYING OUT THE INVENTION

Hereinafter, description will be made in detail as to embodiments of the present invention.

(1) Constitution of Compressor 1

Figure 1:
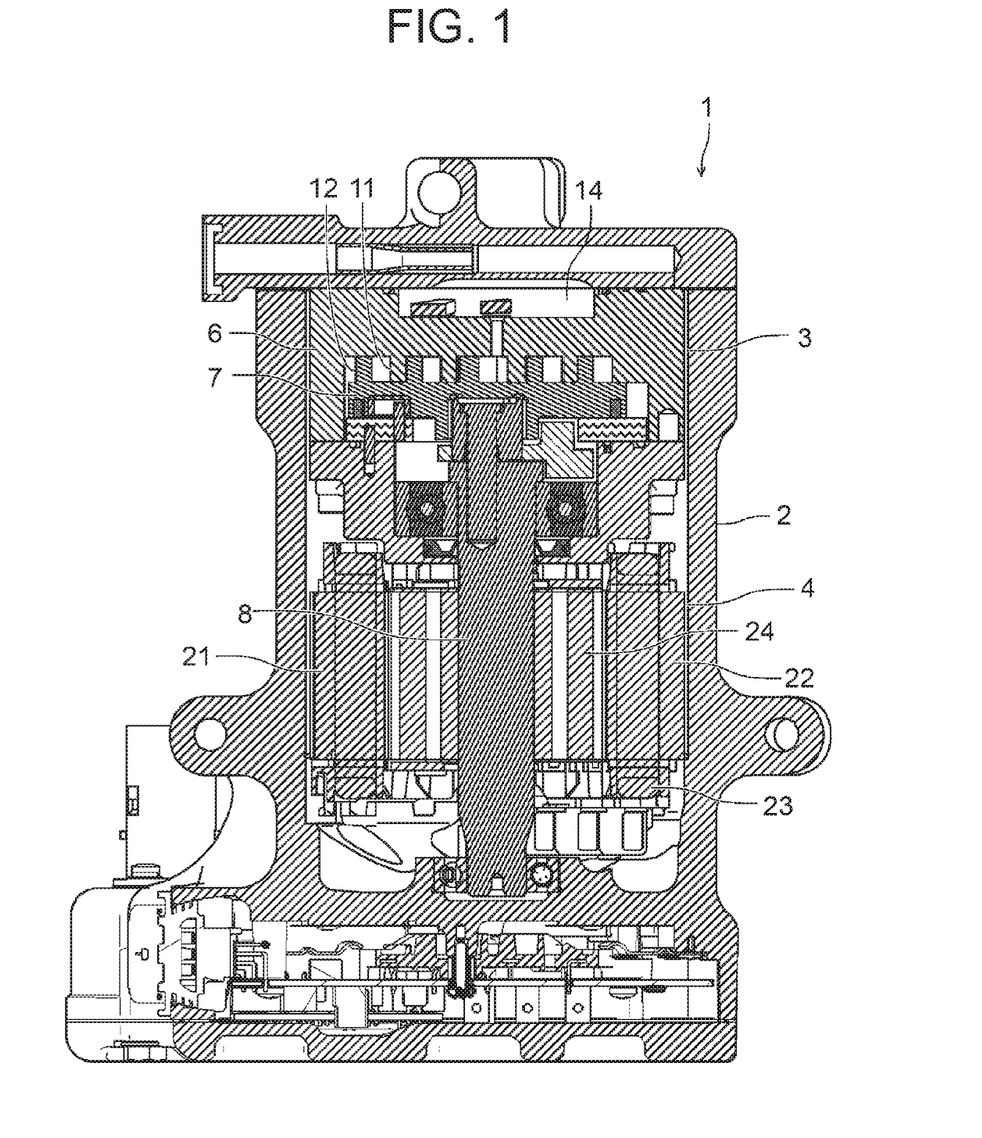
FIG. 1 is a vertical section side view of a compressor of an embodiment to which the present invention is applied.

In FIG. 1, a compressor 1 of the embodiment is a scroll compressor in which a scroll compression element 3 and a motor 4 of the present invention are stored in a container 2. The scroll compression element 3 includes a fixed scroll 6 fixed to the container 2, and a movable scroll 7 revolved by a rotary shaft 8 of the motor 4 without rotating to the fixed scroll 6, and a spiral lap 11 formed in the fixed scroll 6 and a spiral lap 12 formed in the movable scroll 7 are arranged to mesh with each other.

A refrigerant is introduced into the container 2 from an unshown refrigerant introduction passage, and sucked into a compressing chamber constituted between both the laps 11 and 12 from the outside. This compressing chamber narrows toward its center due to a revolving motion of the movable scroll 7, and hence, the sucked refrigerant is compressed and discharged from a central portion through a discharge chamber 14 and an unshown refrigerant discharge passage. Furthermore, a low pressure is provided in the container 2, and hence, the refrigerant also passes the motor 4, so that the motor 4 is cooled with this refrigerant.

Next, description will be made as to the motor 4 of the present invention. The motor 4 of the embodiment is a permanent magnet synchronous motor, and is constituted of a stator 21 including a core 22 and wires 23, and a built-in magnet type of rotor 24 (formed by laminating a plurality of electromagnetic steel plates) which is fixed to the rotary shaft 8 and which rotates on an inner side of the stator 21.

Figure 2:
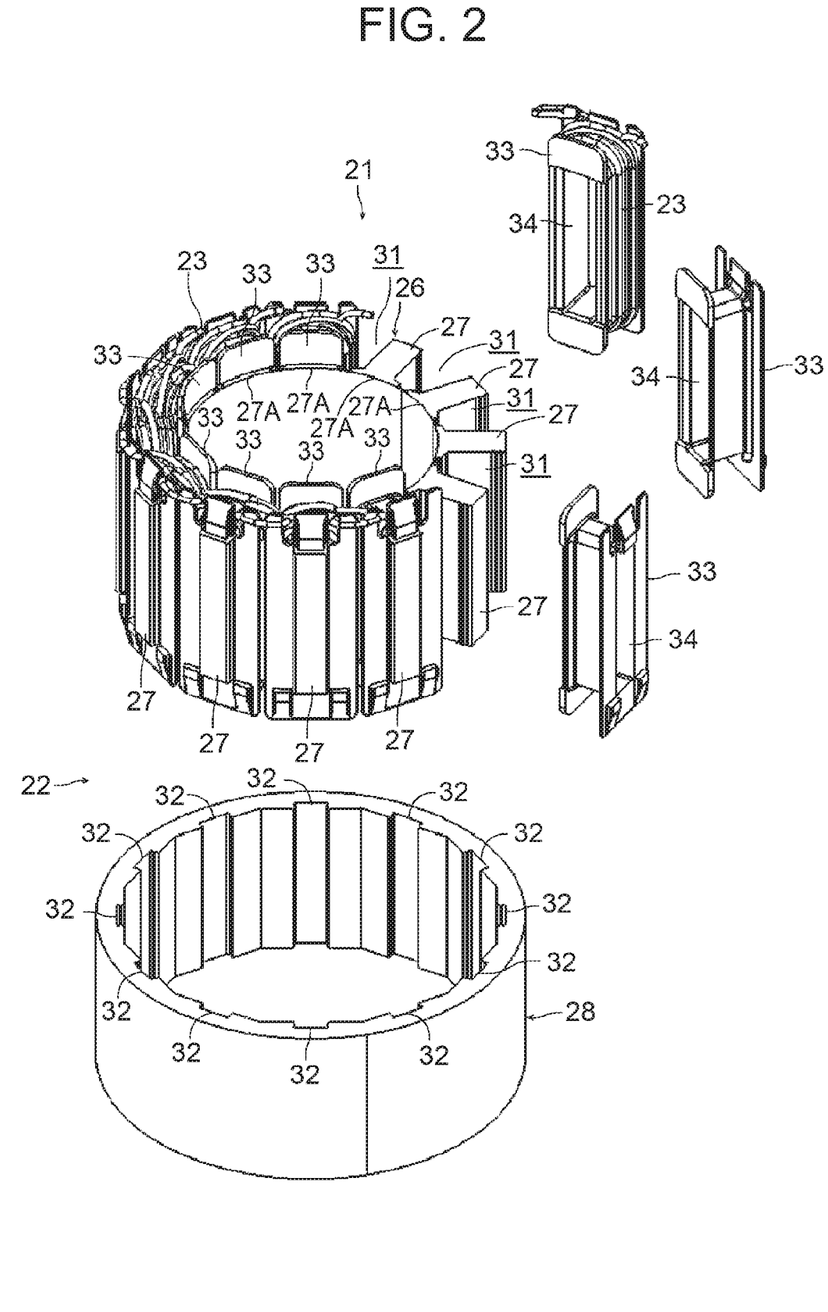
FIG. 2 is an exploded perspective view of a stator constituting a motor of the compressor of FIG. 1.
Figure 3:
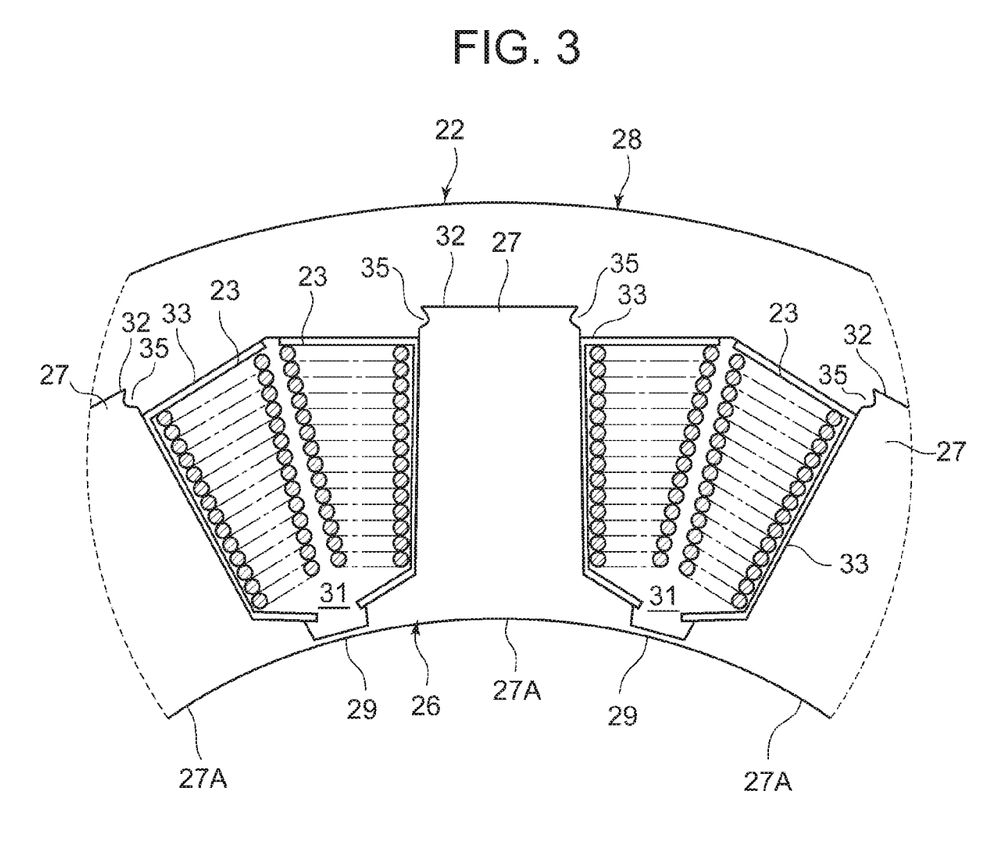
FIG. 3 is an enlarged cross-sectional plan view of a main part of the stator of FIG. 2.

The core 22 of the stator 21 has two divided constitutions in which a teeth member 26 (an inner core) having a plurality of (the number corresponding to the number of poles, e.g., twelve in the embodiment) teeth 27 and a yoke member 28 (an outer core) bonded to an outer side of the teeth member 26 to form a magnetic path are separated, and inner end portions (tip portions) 27A and 27A of the adjacent teeth 27 and 27 of the teeth member 26 are continuous with each other in a bridge portion 29. Consequently, a slot 31 between the respective teeth 27 of the teeth member 26 opens outwardly, and has a closed shape in its central direction.

Figure 7:
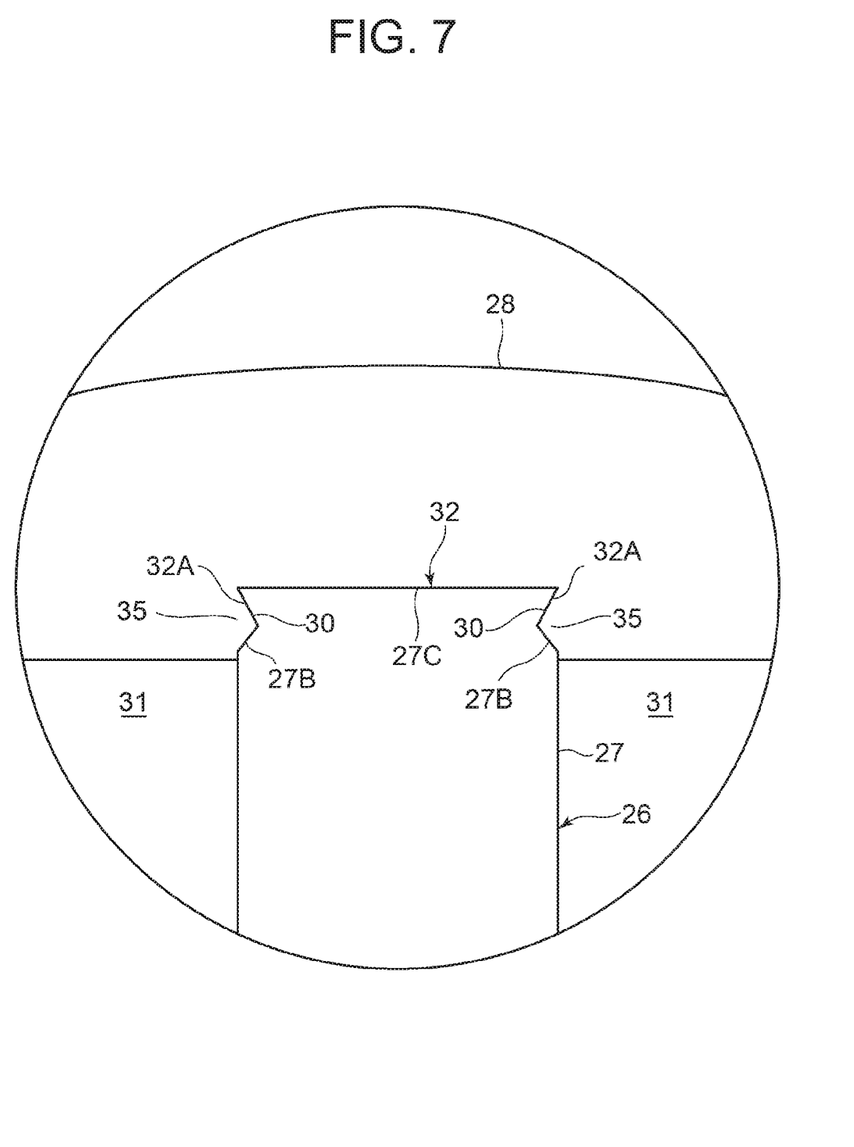
FIG. 7 is an enlarged view of a part of a circle CB in FIG. 5.

Each of the teeth member 26 and the yoke member 28 has a constitution in which a plurality of electromagnetic steel plates (the electromagnetic steel plates made of the same material) are laminated and bonded. Furthermore, in an inner side surface of the yoke member 28, the same number of press-fitting concave regions 32 as the number of the teeth 27 of the teeth member 26 are formed. Each press-fitting concave region 32 is opened inwardly and end portions thereof are also opened in an axial direction of the rotary shaft 8. Additionally, inner side surfaces 32A and 32A of the press-fitting concave region 32 which face each other possess wedged projecting shapes, respectively, as shown in FIG. 7, and projecting portions 35 and 35 having a wedge shape are formed therein.

On the other hand, both side surfaces 27B and 27B of an outer end portion of each teeth 27 which is to be press-fitted into the press-fitting concave region 32 are formed into a recessed shape of a V-shape which matches a projecting shape of the inner side surfaces 32A and 32A of the press-fitting concave region 32, and V-shaped recessed portions 30 and 30 are formed in the side surfaces, respectively. Furthermore, the recessed portions 30 and 30 are formed at positions which match the projecting portions 35 and 35, when the teeth 27 is press-fitted into the press-fitting concave region 32. It is to be noted that description will be made later in detail as to a shape of the projecting portion 35 or the recessed portion 30. Additionally, the wire 23 is beforehand wound on a bobbin 33 constituted of an insulator, and in the bobbin 33, there is formed an attaching hole 34 into which the teeth 27 of the teeth member 26 is to be inserted.

(2) Assembling of Stator 21

Then, when the stator 21 is assembled, the electromagnetic steel plates are initially laminated and bonded, thereby constituting the teeth member 26 and the yoke member 28. Furthermore, the wire 23 is wound on the bobbin 33, and twelve bobbins are prepared. Next, the teeth 27 of the teeth member 26 are inserted into the attaching holes 34 of the respective bobbins 33 on which the wires 23 are wound so that the bobbins 33 are attached to all the teeth 27 from the outside (twelve bobbins in total are attached).

Figure 4:
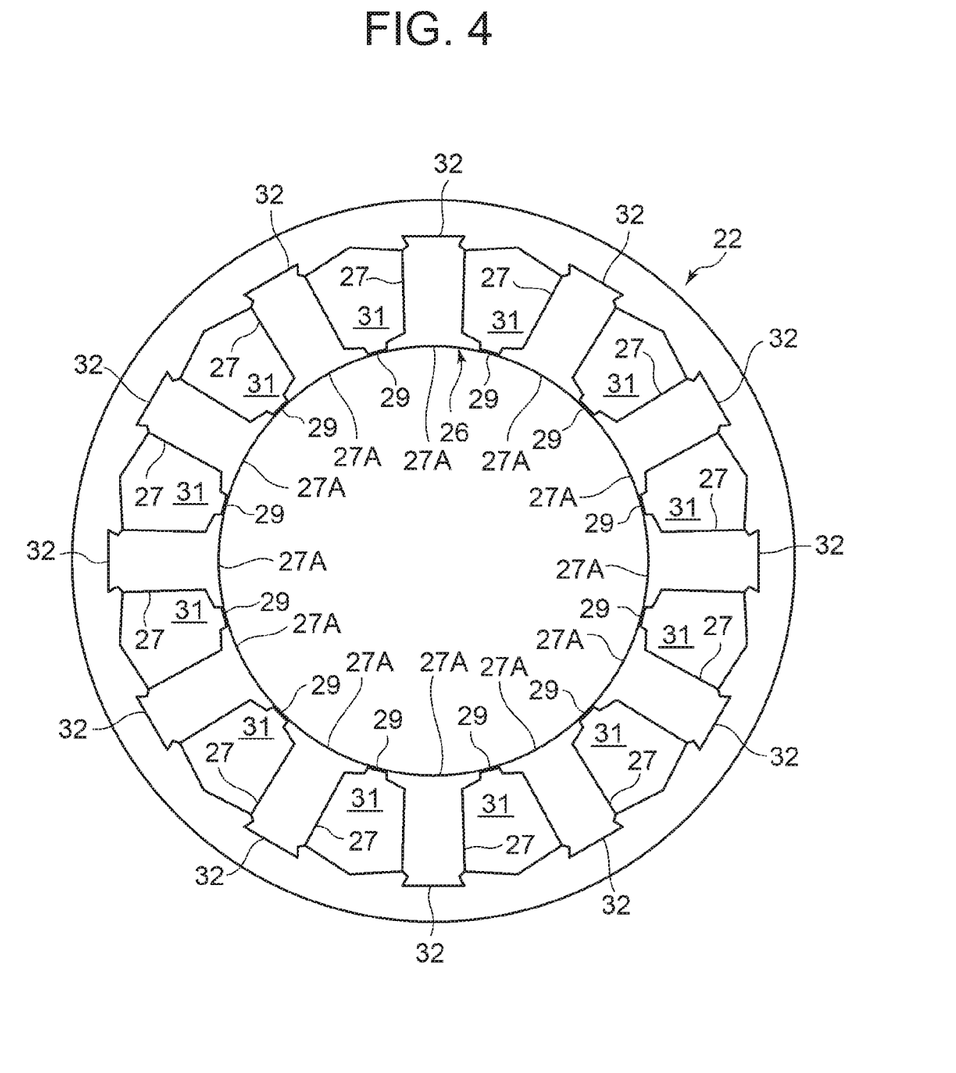
FIG. 4 is a plan view of a core of the stator of FIG. 2.
Figure 5:
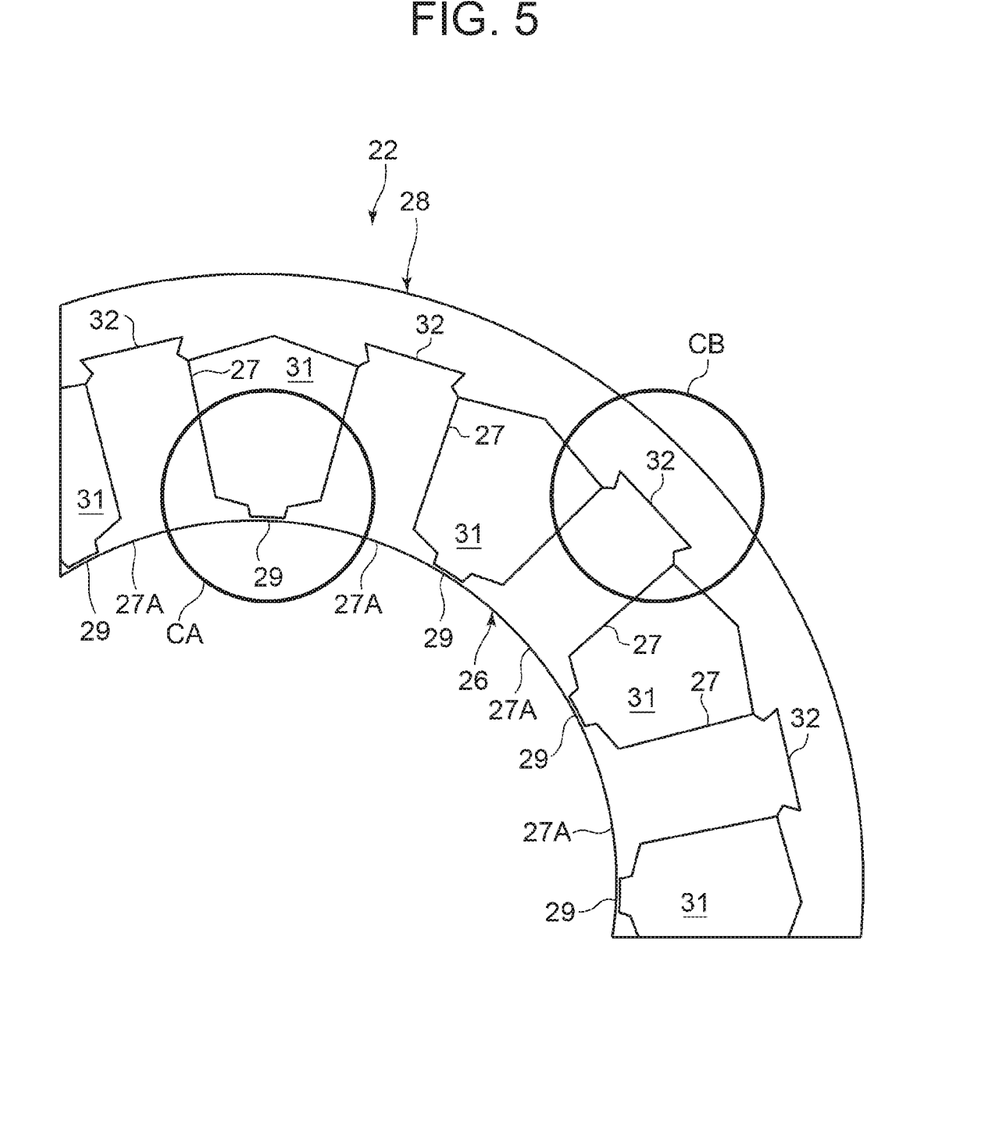
FIG. 5 is an enlarged plan view of a main part of the core of FIG. 4.

In this way, the wires 23 are wound on the teeth member 26. Next, the yoke member 28 is bonded to the outer side of the teeth member 26 provided with the wires 23. In this case, the outer end portions of the respective teeth 27 of the teeth member 26 are press-fitted into the respective press-fitting concave regions 32 of the yoke member 28 in the axial direction (from the upside in FIG. 2), thereby integrating the teeth member 26 and the yoke member 28 (FIG. 7). It is to be noted that the wires 23 of the respective bobbins 33 are arranged to constitute a predetermined electric circuit. Furthermore, in and after FIG. 4, the drawing of the bobbins 33 and the wires 23 is omitted.

Thus, in the stator 21, the inner end portions (the tip portions) 27A of the teeth 27 are continuous, and the wires 23 are attached to the outwardly opened slots 31 from the outside, and hence, a density of the wires is increased to be larger than that in a motor on which a wire is directly wound from a nozzle inserted into a clearance of each of teeth tips, and improvement of performance is achievable.

(3) Bridge Portion 29

Furthermore, in the teeth member 26, the inner end portions (the tip portions) 27A of the respective teeth 27 are continuous in the bridge portions 29, thereby improving their rigidities, and hence, there is the advantage that an amount of deformation of the core 22 of the stator 21 due to a reactive force generated from an electromagnetic force which accompanies the rotation of the rotor 24 is also decreased and that generation of vibration is also inhibited. However, drop of torque due to a leakage magnetic flux which passes a continuous portion of each teeth 27 becomes a problem.

Figure 6:
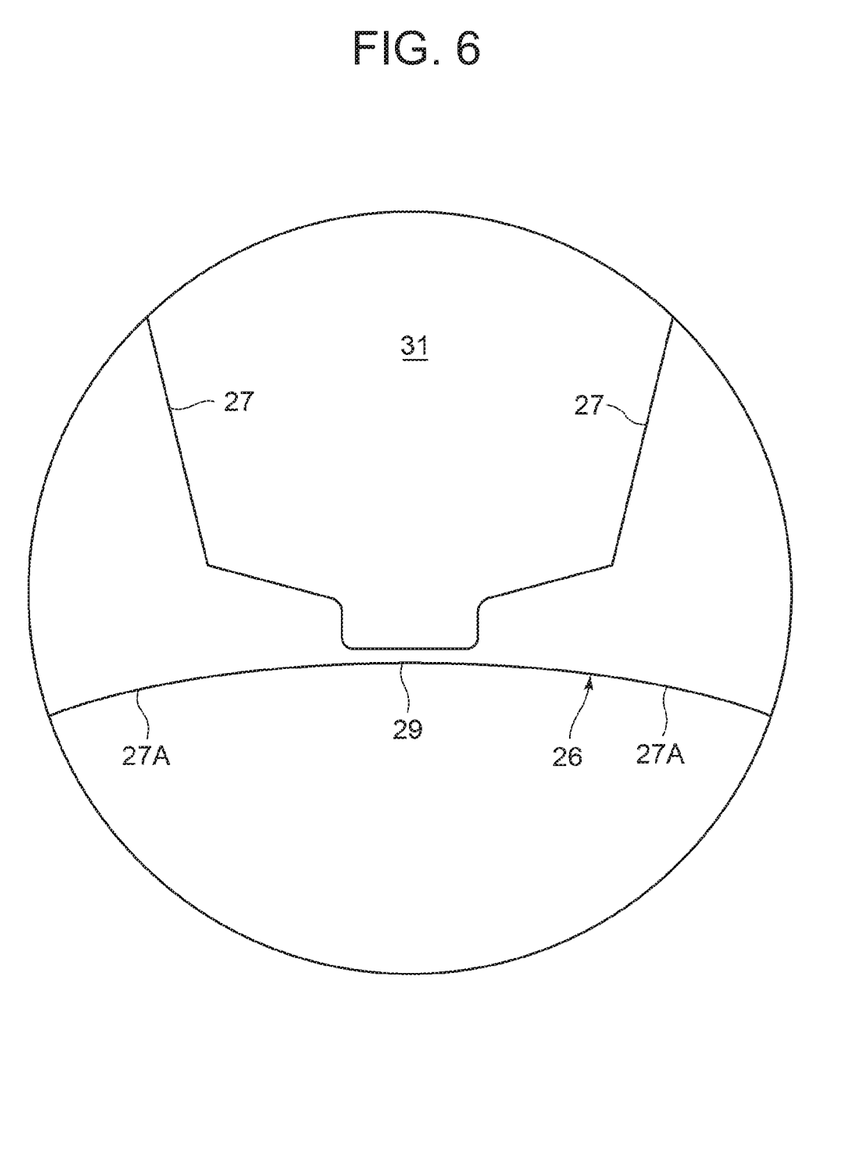
FIG. 6 is an enlarged view of a part of a circle CA in FIG. 5.

To eliminate such a problem, in the embodiment, the bridge portions 29 are formed so that a width of each bridge portion in a radial direction is narrower than that of the inner end portion 27A of the teeth 27 and the bridge portion has a predetermined length dimension in a circumferential direction (FIG. 6). Consequently, a magnetic flux is hard to pass the bridge portions 29, leakage of the magnetic flux which takes a shortcut between the inner end portions 27A of the teeth 27 remarkably decreases, and hence, the drop of the torque due to the leakage magnetic flux is effectively inhibited.

(4) Projecting Portions 35 and 35 of Press-Fitting Concave Region 32 and Recessed Portions 30 and 30 of Teeth 27

Next, description will be made in detail as to shapes of the projecting portions 35 and 35 formed in the inner side surfaces 32A and 32A of the press-fitting concave region 32 of the yoke member 28 which face each other, and the recessed portions 30 and 30 formed in both the side surfaces 27B and 27B of the outer end portion of the teeth 27 to be press-fitted into the press-fitting concave region 32.

As described above, the wedge-shaped projecting portions 35 and 35 are formed in the inner side surfaces 32A and 32A of the press-fitting concave region 32 of the yoke member 28 which face each other, respectively, and the V-shaped recessed portions 30 and 30 are formed in both the side surfaces 27B and 27B of the outer end portion of the teeth 27 of the teeth member 26 which is to be press-fitted into the press-fitting concave region 32, respectively. Furthermore, the recessed portions 30 and 30 are formed at the positions which match the projecting portions 35 and 35 when the teeth 27 is press-fitted into the press-fitting concave region 32, and hence, outwardly positioned surfaces P (shown in FIG. 8) of inner surfaces of the respective V-shaped recessed portions 30 and 30 can receive a fastening load Fr (shown in FIG. 8) generated in press-fitting the teeth 27 of the teeth member 26 into the press-fitting concave region 32 of the yoke member 28 and directed inwardly from the outside.

Consequently, it is possible to decrease stress to be applied to the bridge portions 29 in bonding the teeth member 26 and the yoke member 28, and hence, even when the width of each of the bridge portions 29 is narrowed, its deformation can be inhibited. In consequence, the width of the bridge portion 29 can be narrowed so that the magnetic flux is hard to pass as in the embodiment, but in accordance with the shapes or dimensions of the projecting portion 35 and the recessed portion 30, the recessed portion 30 or the projecting portion 35 is crushed due to the fastening load Fr, and the stress to be applied to the bridge portions 29 cannot decrease. Furthermore, when the recessed portions 30 are formed and strength of the teeth member 26 itself therefore deteriorates, it is not possible to counteract stress of a bend moment generated by an electromagnetic force F (shown in FIG. 9) of the rotating rotor 24.

(5) Shapes of Projecting Portions 35 and 35 and Recessed Portions 30 and 30

Figure 8:
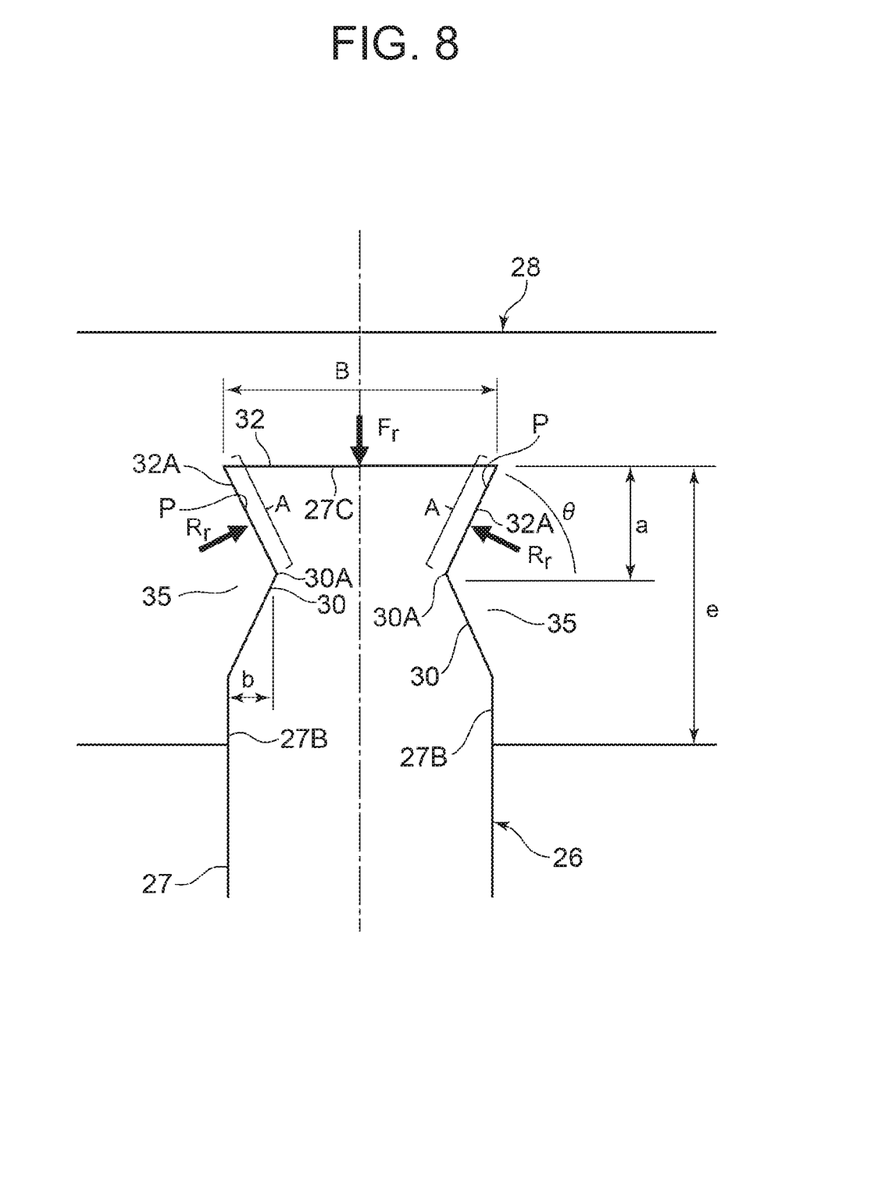
FIG. 8 is a diagram to explain a shape of a bonded portion between a teeth member and a yoke member shown in FIG. 7, and a load and stress which act on the portion.
Figure 9:
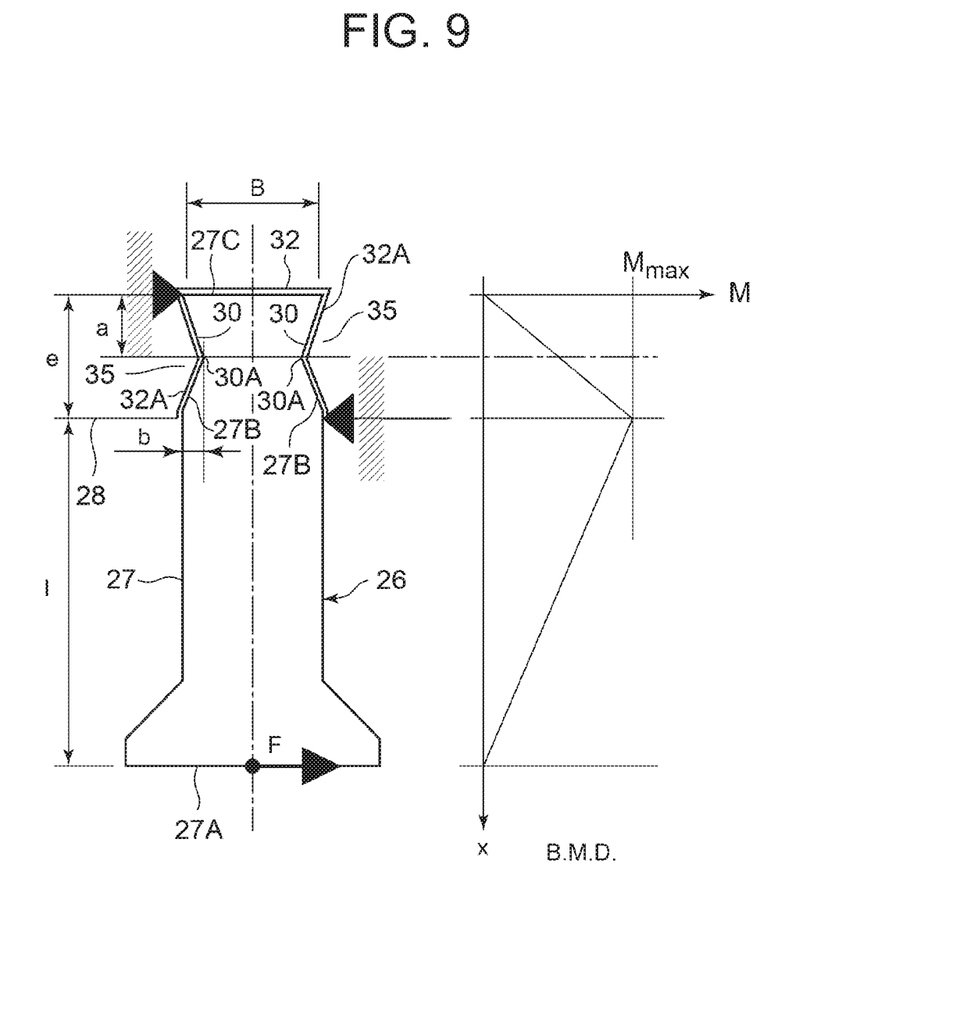
FIG. 9 is a diagram to explain the shape of the bonded portion between the teeth member and the yoke member shown in FIG. 7, and stress of a bend moment which acts on the portion.

To eliminate such a problem, in the present invention, the dimensions or shapes of the projecting portions 35 and 35 of the press-fitting concave region 32 and the recessed portions 30 and 30 of the teeth 27 are verified. FIG. 8 schematically shows a bonded portion between the teeth member 26 and the yoke member 28, and FIG. 9 schematically shows one teeth 27 of the teeth member 26 (the bridge portion 29 is omitted) and the press-fitting concave region 32. It is to be noted that the verification is performed by using, as a parameter, a dimension a from an outer end face 27C of the teeth 27 to an apex 30A of the V-shape of the recessed portion 30 in a direction parallel to the radial direction and setting this dimension a to a proper range. Furthermore, FIG. 9 shows that the outer end portion of the teeth 27 is disposed away from the press-fitting concave region 32, but in actual, both the teeth and the region are brought into contact under pressure with each other with a predetermined overlapping margin.

(5-1) Range to Prevent Crush of Outwardly Positioned Surfaces P of Inner Surfaces of V-Shaped Recessed Portions 30 and 30

Initially, in FIG. 8, a is the dimension from the outer end face 27C of the teeth 27 to the apex 30A of the V-shape of the recessed portion 30 in the direction parallel to the radial direction, b is a dimension from a side surface of the teeth 27 to the apex 30A of the V-shape of the recessed portion 30 in a width direction of the teeth 27, e is a dimension from the outer end face 27C of the teeth 27 to a position of an opening of the press-fitting concave region 32 in the direction parallel to the radial direction, θ is an angle formed by the outwardly positioned surface P of the inner surface of the V-shaped recessed portion 30 and a line in the circumferential direction, A is a width dimension of the surface P, B is a width dimension of the teeth 27, L is a laminate thickness of the teeth member 26 and the yoke member 28 (an overall thickness dimension of the laminated electromagnetic steel plates), and Fr is the fastening load to be applied to the teeth 27 when the outer end portion of the teeth 27 of the teeth member 26 is press-fitted into the press-fitting concave region 32 of the yoke member 28.

Furthermore, when contact stress to be applied to the teeth 27 in the press-fitting is defined as σr, a contact reactive force is defined as Rr, contact stress of the surface P is defined as σa, and yield stress of the electromagnetic steel plate (a material) constituting the teeth member 26 and the yoke member 28 is defined as σy, the fastening load Fr is represented by Equation (I) mentioned below, and the contact stress σa of the surface P is represented by Equation (II) mentioned below.

$$Fr = \sigma r \cdot B \cdot L \ldots \quad (I)$$

$$\sigma a = Rr/(A \cdot L) + \sigma r \ldots \quad (II)$$

When Equation (II) mentioned above is deformed to σa=Rr/(A·L)+σr=(Fr/sin θ)/(b/cos θ·L)+σr=Fr/(B·L)·1/tan θ+σr=(Fr/L)·(1/a)+σr=σr(B·(1/a)+1), the following equation is eventually formed:

$$\sigma a = \sigma r (B \cdot (1/a) + 1) \ldots \quad (III).$$

Then, when the contact stress σa of the surface P is not more than the yield stress σy, the outwardly positioned surface P of the inner surface of the V-shaped recessed portion 30 is not crushed by the fastening load Fr. Therefore, when a right side of Equation (III) mentioned above is substituted into a left side of this relation (σa≤σy) and a is derived, the following equation is formed.

$$\sigma r \cdot B/(\sigma y - \sigma r) \leq a \ldots \quad (IV)$$

That is, it is seen that when the dimension a is set to the range of Equation (IV) mentioned above, the outwardly positioned surfaces P of the inner surfaces of the V-shaped recessed portions 30 of the teeth 27 are not crushed by the fastening load Fr, and there is prevented the disadvantage that the stress to be applied to the bridge portions 29 of the inner end portions 27A of the teeth 27 increases.

(5-2) Range to prevent Strength Deterioration of Teeth Member 26

Next, in FIG. 9, 1 is a dimension from the inner end portion 27A of the teeth 27 to the opening of the press-fitting concave region 32 (the inner side surface of the yoke member 28), and the other dimensions are similar to those of FIG. 8. When the bend moment to be applied to the teeth 27 at a position of the dimension a due to the electromagnetic force F of the rotating rotor 24 (shown in FIG. 9) is Ma, a bend moment to be applied to the teeth 27 at a position of the dimension e is Me, surface stress to be applied to the teeth 27 at the position of the dimension a is σab, and surface stress to be applied to the teeth 27 at the position of the dimension e is σeb, the moment Ma, the moment Me, the surface stress σab and the surface stress σeb are represented by Equations (V) to (VIII) mentioned below, respectively.

$$Ma = F \cdot (1/e) \cdot a \quad \ldots \text{(V)}$$

$$Me = F \cdot 1 \quad \ldots \text{(VI)}$$

$$\sigma ab = 6Ma / \{L \cdot (B-2b)^2\} \quad \ldots \text{(VII)}$$

$$\sigma eb = 6Me / (L \cdot B^2) \quad \ldots \text{(VIII)}$$

When the recessed portion 30 is not formed, the bend moment to be applied to the teeth 27 is maximized at the position of the dimension e (denoted with Mmax in a diagram shown on the right side of FIG. 9). Therefore, when the surface stress σab of the teeth 27 at the position of the dimension a is not more than the surface stress σeb of the teeth 27 at the position of the dimension e, there is eliminated the problem that the strength of the teeth member 26 itself deteriorates due to the formation of the recessed portion 30. Consequently, when Equation (VII) mentioned above is substituted into a left side of this relation (σab≤σeb) and Equation (VIII) mentioned above is substituted into a right side thereof to derive a, the following equation is formed.

$$a \leq \{(B-2b)/B\}^2 \cdot e \quad \ldots \text{(IX)}$$

That is, it is seen that when the dimension a is set to the above range of Equation (IX) mentioned above, there is prevented the deterioration of the strength of the teeth 27 itself due to the formation of the recessed portions 30 in the outer end portions of the teeth 27.

(5-3) Proper Range of Dimension a

Therefore, it is seen from Equation (IV) and Equation (IX) mentioned above that the Equation (X) mentioned above indicates the proper range of the dimension a.

$$\sigma r \cdot B/(\sigma y - \sigma r) \leq a \leq \{(B-2b)/B\}^2 \cdot e \quad \ldots \text{(X)}$$

Figure 10:
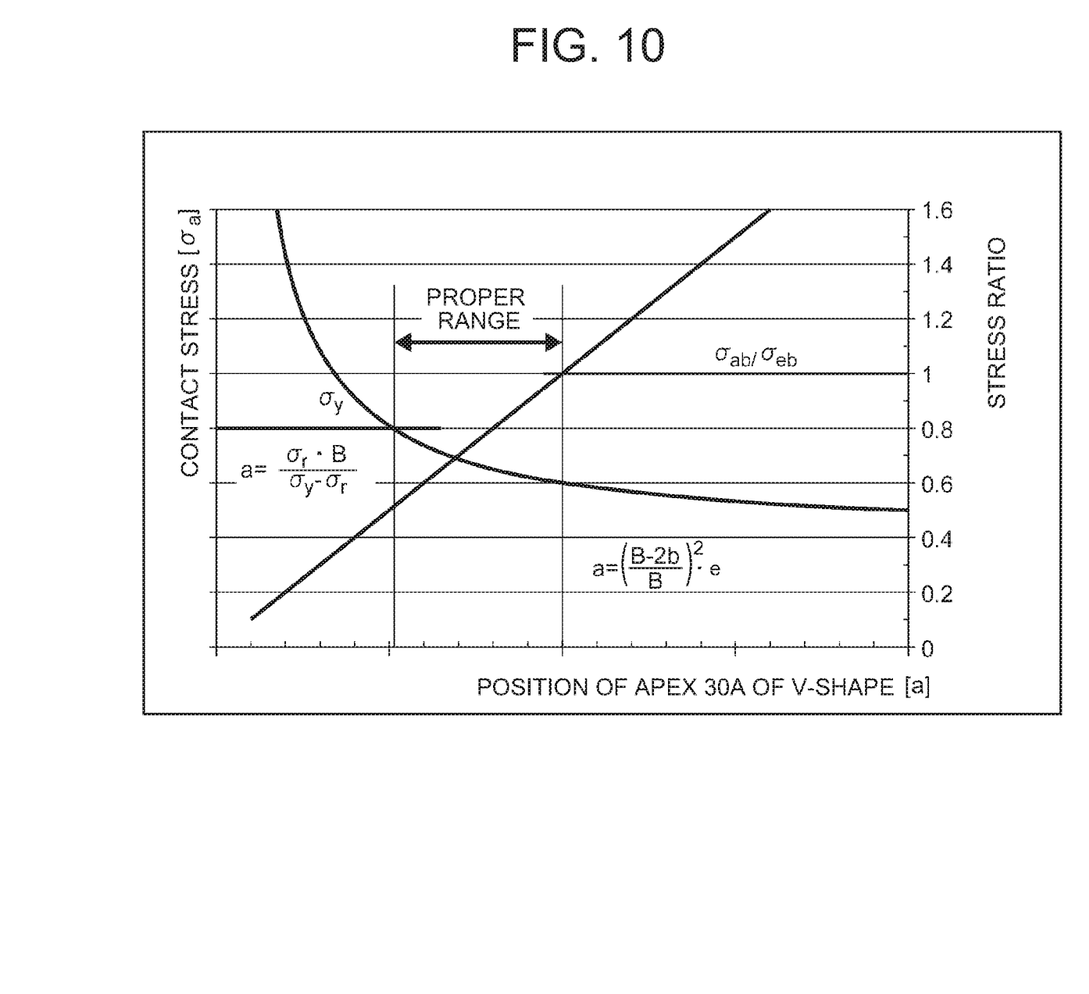
FIG. 10 is a diagram to explain a proper range of the shape of the bonded portion between the teeth member and the yoke member.

FIG. 10 shows this behavior. It is to be noted that the ordinate on the right side of FIG. 10 indicates a ratio (a stress ratio: σab/σeb) of the surface stress σab to the surface stress σeb. When the ratio is 1 or less, a relation (σab≤σeb) is satisfied. Furthermore, the ordinate on the left side indicates the contact stress σa, and the stress may be not more than yield stress σy. Furthermore, the abscissa indicates the position of the apex 30A of the V-shape (a value of the dimension a).

In the embodiment, the dimension a is set to this range of Equation (X). Consequently, it is possible to prevent the disadvantage that the outwardly positioned surfaces P of the inner surfaces of the V-shaped recessed portions 30 are crushed and that the stress to be applied to the bridge portions 29 of the inner end portions 27A of the teeth 27 increases. Furthermore, it is possible to prevent the deterioration of the strength of the teeth 27 themselves which is caused by forming the recessed portions 30 in the outer end portions of the teeth 27, and it is possible to counteract the bend moment generated by the electromagnetic force F of the rotating rotor 24 without hindrance. In general, it is possible to decrease the deformation of the bridge portions 29 due to both of the stress of the fastening load Fr generated in bonding the teeth member 26 and the yoke member 28 and the stress of the bend moment generated by the electromagnetic force F of the rotating rotor 24.

It is to be noted that the recessed portions 30 formed in the teeth 27 of the teeth member 26 have a shape which matches the projecting portions 35 formed in the press-fitting concave regions 32 of the yoke member 28, and hence, the dimension a shown in FIG. 8 and FIG. 9 of the above embodiment can be replaced with a dimension from an inner bottom surface of the press-fitting concave region 32 (the surface which matches the outer end face 27C of the teeth 27) to an apex of the wedge shape of the projecting portion 35 in a direction parallel to the radial direction, the dimension b can be replaced with a dimension from the inner side surface 32A of the press-fitting concave region 32 to the apex of the wedge shape of the projecting portion 35 in a width direction of the press-fitting concave region 32, the dimension e can be replaced with a depth dimension of the press-fitting concave region 32 (a dimension of the inner side surface 32A in a thickness direction of the yoke member 28), the angle θ can be replaced with an angle formed by an outer surface of the projecting portion 35 and a line in a circumferential direction, A can be replaced with a width dimension of the outer surface of the projecting portion 35, the dimension B can be replaced with a width dimension of the inner bottom surface of the press-fitting concave region 32, or can be replaced with contact stress to be applied to the press-fitting concave region 32 in the press-fitting, and σa can be replaced with contact stress of the outer surface of the projecting portion 35. Furthermore, the teeth member 26 and the yoke member 28 are made of the same material, and hence, the crush due to the fastening load occurs not only in the teeth 27 but also in the press-fitting concave regions 32 of the yoke member 28.

Additionally, in the embodiment, it has been described that the projecting portions 35 have the wedge shape, but this does not restrict the inventions of other embodiments, and the projecting portions may have a circular shape or a rectangular shape. Furthermore, in the embodiment, the present invention is employed in the scroll compressor, but this does not restrict the invention, and the motor 4 of the present invention is suitable for various compressors including a rotary compressor.

DESCRIPTION OF REFERENCE NUMERALS 1 compressor
2 container
3 scroll compression element
4 motor
8 rotary shaft
21 stator
22 core
23 wire
24 rotor
26 teeth member 27 teeth
27A inner end portion
27B side surface
27C outer end face
28 yoke member
29 bridge portion
30 recessed portion
30A apex of V-shape
31 slot
32 press-fitting concave region
32A inner side surface
35 projecting portion
P outwardly positioned surface of an inner surface of the V-shaped recessed portion

The invention claimed is:

1. A compressor motor which is stored m a container to drive a compression element, comprising:
   a stator, and a rotor which is fixed to a rotary shaft to drive the compression element and which rotates on an inner side of the stator,
   wherein the stator is constituted of:
   a teeth member in which inner end portions of adjacent teeth are continuous in a bridge portion and on which wires are wounded, and
   a yoke member bonded to an outer side of the teeth member to form a magnetic path,
   wherein the yoke member comprises press-fitting concave regions which are opened inwardly and into which outer end portions of the teeth are press-fitted,
   wherein projecting portions which have a wedge shape are formed in the inner side surfaces of the press-fitting concave regions which face each other, respectively,
   wherein recessed portions which have a V-shape which matches the wedge shape of the projecting portions are formed at positions which match the respective projecting portions of the press-fitting concave regions, in both the side surfaces of each of the outer end portions of the teeth, respectively, and the projecting portions are press-fitted into the recessed portions, respectively,
   wherein when a dimension from an outer end face of each of the teeth to an apex of the V-shape of the recessed portion in a direction parallel to a radial direction is defined as a, a dimension from a side surface of the teeth to the apex of the V-shape of the recessed portion in a width direction of the teeth is defined as b, a width dimension of the teeth is defined as B, a dimension from the outer end face of the teeth to a position of an opening of the press-fitting concave region in the direction parallel to the radial direction is defined as e, yield stress of the teeth member is defined as $\sigma y$, and contact stress to be applied to the teeth when the outer end portion of the teeth is press-fitted into the press-fitting concave region is defined as $\sigma r$, a value of the a is set to a range of $\sigma r \cdot B/(\sigma y - \sigma r) \leq a \leq \{(B-2b)/B\}^2 \cdot e$.

2. A compressor in which the motor according to claim 1 and the compression element are stored in the container.

* * * * *